United States Patent [19]

Scarpetti

[11] Patent Number: 5,591,508
[45] Date of Patent: Jan. 7, 1997

[54] COATING METHODS AND COMPOSITIONS FOR PRODUCTION OF DIGITIZED STEREOSCOPIC POLARIZING IMAGES

[75] Inventor: Julius J. Scarpetti, Revere, Mass.

[73] Assignee: Rowland Institute for Science, Cambridge, Mass.

[21] Appl. No.: 380,941

[22] Filed: Jan. 31, 1995

[51] Int. Cl.⁶ ..................................................... B32B 9/00
[52] U.S. Cl. .................... 428/105; 428/35.6; 428/36.7; 428/304.4; 40/548; 359/462; 359/465
[58] Field of Search ............................. 40/548; 359/465, 359/462; 88/65; 428/35.6, 36.7, 105, 304.4

[56]  References Cited

U.S. PATENT DOCUMENTS

| | | | |
|---|---|---|---|
| 2,184,999 | 12/1939 | Land et al. | 88/65 |
| 2,200,959 | 5/1940 | Land | 40/130 |
| 2,203,687 | 6/1940 | Land et al. | 88/16.6 |
| 2,204,604 | 6/1940 | Land | 95/5 |
| 2,281,101 | 4/1942 | Land | 88/29 |
| 2,289,714 | 7/1942 | Land | 88/16.4 |
| 2,289,715 | 7/1942 | Land | 88/29 |
| 2,298,058 | 10/1942 | Land | 88/65 |
| 2,298,059 | 10/1942 | Land | 88/65 |
| 2,299,906 | 10/1942 | Land | 95/8 |
| 2,315,373 | 3/1943 | Land | 88/29 |
| 2,329,543 | 9/1943 | Land | 8/65 |
| 2,346,766 | 4/1944 | Land | 88/65 |
| 2,348,912 | 5/1944 | Land | 88/65 |
| 2,356,250 | 8/1944 | Land | 88/65 |
| 2,397,149 | 3/1946 | Land | 88/65 |
| 2,397,232 | 3/1946 | Land | 88/65 |
| 2,397,276 | 3/1946 | Land | 88/65 |
| 2,402,166 | 6/1946 | Land | 88/65 |
| 2,423,503 | 7/1947 | Land et al. | 88/65 |
| 2,423,504 | 7/1947 | Land et al. | 88/65 |
| 2,440,102 | 4/1948 | Land | 88/65 |
| 2,493,200 | 1/1950 | Land | 88/112 |
| 2,788,707 | 4/1957 | Land | 88/24 |
| 5,146,415 | 9/1992 | Faris | 395/101 |
| 5,398,131 | 3/1995 | Hall et al. | 359/465 |

FOREIGN PATENT DOCUMENTS

| | | |
|---|---|---|
| 0444950A2 | 9/1991 | European Pat. Off. . |
| 0587164A2 | 3/1994 | European Pat. Off. . |
| 06191084 | 7/1994 | Japan . |

OTHER PUBLICATIONS

Lee, F. (1989) "Overview of Thermal Ink Jet Technology" SPIE 1079: 342–349.

Walworth, V. "Polarized Light Techniques for 3-D Display" IGC Conference: Three Dimensional Display Techniques (Monterey, CA) Jun. 9–11, 1985.

International Search Report, Issued Jun. 7, 1996 during the prosecution of PCT/US96/01043.

Primary Examiner—Patrick Ryan
Assistant Examiner—Cathy K. Lee
Attorney, Agent, or Firm—Thomas J. Engellenner; Mark A. Kurisko; Lahive & Cockfield

[57]  ABSTRACT

The transfer of dichroic inks into stretched and oriented substrates to form stereoscopic polarizing images and the like can be improved by the use of coatings which enhance imbibition of the ink into the substrate. The coatings serve to hold the ink in situ for a sufficient period of time to permit absorption of the dye and transfer of rich colors while minimizing the problems of smearing and/or runoff of unabsorbed ink. The present invention is particularly use will in the adaptation of ink jet printing techniques to the formation of stereoscopic polarizing images.

32 Claims, 4 Drawing Sheets

COATING METHODS AND COMPOSITIONS FOR PRODUCTION OF DIGITIZED STEREOSCOPIC POLARIZING IMAGES

BACKGROUND OF THE INVENTION

This invention relates to improved methods and apparatus for the production of digitized stereoscopic polarizing images, and in particular to new and useful coatings for regulating imbibition of an ink by a substrate.

Ordinary (unpolarized) light is made of electromagnetic waves vibrating equally in all directions perpendicular to their direction of travel. Absorption-polarizing sheets polarize these light waves by partially or wholly absorbing the vectorial components vibrating in a specified direction transverse to the direction of travel.

A stereoscopic image based on the polarization of light is generally formed of a pair of polarizing images, each of which presents a light-polarizing design or image that selectively transmits light of a predetermined vector of polarization.

Stereoscopic image pairs, having a left-eye light-polarizing image superimposed on a right-eye light-polarizing image, enable the perception of a three-dimensional image when the image pair is viewed through a pair of polarizing filters, or analyzers, oriented to allow the left-eye polarized image to reach the left eye and the right-eye polarized image to reach the right eye. A polarizing image can be made by a sheet that polarizes light to different percentages, depending upon the density of the image at each point. In particular, the percentage of polarization is directly related to the image's density, nearly all light being polarized in high-density areas and only a small amount of light being polarized in low-density areas.

When forming the stereoscopic polarizing image, the most effective arrangement occurs when the polarization axis of the left-eye image is at right angles to the polarization axis of the right-eye image, and when the two layers are superimposed in such position with respect to each other that the images carried thereby are stereoscopically registered. An observer using viewing spectacles comprising orthogonal polarizing left-eye and right-eye lenses, then has each of his or her eyes receiving only the image intended for it, and the pair of images appears as a single three-dimensional image.

Various techniques exist for producing light-polarizing images on the light polarizing sheets. For example, in Land, U.S. Pat. No. 2,204,604, a light-polarizing sheet may initially be formed by a light polarizing material, such as an optically oriented suspension of minute crystals of herapathite or other polarizing material, in a suitable medium, such as cellulose acetate. A picture may then be reproduced on the light polarizing sheet by altering the polarizing characteristics of the sheet over pre-determined areas of the sheet, forming the negative of the desired image. The areas forming the design may be protected with a coating, such as wax, and the sheet subjected to a treatment that destroys or otherwise alters the polarizing characteristics of the exposed areas.

An alternative method for forming the stereoscopic print, as described in Land, U.S. Pat. No. 2,281,101, is to employ a Vectograph™ sheet material comprising a linear hydrophilic polymer, such as polyvinyl alcohol (hereinafter "PVA"), which has been treated such that its molecules are substantially oriented to be parallel to a specific axis. Orientation of polyvinyl alcohol generally can be accomplished by softening the PVA sheet, as for example by subjecting it to heat, or to the action of a softening agent, until the sheet may be stretched or extended, and then by stretching or extending until suitable orientation of the molecules has been obtained. In the case of polyvinyl alcohol for example, the sheet would generally be extended from two to four or five times its length. Once stretched, the PVA sheet is ready for lamination to a non-depolarizing base.

Further in accordance with Land, U.S. Pat. No. 2,281,101, polarizing images may be formed in PVA by printing thereon with certain dichroic, water-soluble, direct dyes of the azo type, or by staining the sheet with iodine in the presence of an iodide. The color of the dichroic image reproduced in this sheet may be controlled by selecting suitable dyes, stains or the like. The stain or dye is applied to the sheet from a halftone plate or a gelatin relief.

The term dichroism is used herein as meaning the property of differential absorption of the components of polarization of an incident beam of light, depending upon the vibration directions of the components. Dichroic dye or stain as used herein refers to a dye or stain whose molecules possess the property of becoming linearly disposed within the oriented sheet material. For example, when a molecularly-oriented polymeric sheet is dyed with a dichroic dye, the sheet will appear dichroic, i.e., it will absorb differently the vectorial components of polarization of an incident beam of light.

According to another method for forming polarizing images, disclosed in Land, U.S. Pat. No. 2,289,714, polarizing images in full color may be produced. In this process, the use of three subtractive dichroic dyes—a minus Red, a minus Green, and a minus Blue dye forming respectively the Cyan, Magenta, and Yellow images—allows the production of a full color image. To achieve full-color stereoscopic images, the Land '714 patent teaches that six well-registered gelatin relief images, a cyan pair, a magenta pair, and a yellow pair, must first be prepared; one relief for each color component in each of the two directions of polarization. Each of the six gelatin reliefs is then appropriately dyed, and an image from each relief is subsequently transferred to the appropriately oriented PVA layer.

One of the drawbacks of this method for producing full color stereoscopic images, as it is currently practiced, is the difficulty and time involved in transferring an image to the oriented polymer sheets. For example, to produce a full-color image with known methods requires transferring each color component of the image from a gelatin relief to the polymer sheet. Besides being time-consuming and expensive, this technique requires great precision in aligning each of the printed images to produce a clear and precise stereoscopic image. Another drawback with known techniques is the difficulty in masking the image. To alter the final three-color stereoscopic image even slightly, all six gelatin reliefs must be altered.

Masking is a term used to describe various methods for enhancing separation records, or original transparencies, in order to compensate for the unwanted absorptions of the subtractive dyes used in making a full color stereoscopic image. Conventional photographic negatives and positives are held in register with the original slide or the separations to provide improved highlights, cleaner colors, controlled contrast, improved shadow detail, and ultimately remove unwanted colors. These methods are described in great detail in "The Reproduction Of Colour" by R. W. G. Hunt and "Neblette's Handbook Of Photography and Reprography" edited by John M. Sturge.

There is a need for a more efficient method of producing a stereoscopic image that combines the traditional advantages of the prior art while eliminating some of its disadvantages. Accordingly, an object of the invention is to provide a method of producing an easier and more efficient method of producing full-color stereoscopic polarizing images.

It is also an object of this invention to provide methods, systems and materials that facilitate ink-jet printing of digitized stereoscopic polarizing images.

It is a further object of the invention to produce digitized stereoscopic polarizing images that are easily optimized using computer software. Other objects of the invention include forming polarizing images from: digital images generated by computer software, digital images stored on CD ROM, or digital images produced from slides, photographs, digital cameras, or the like.

Further objects of the invention include providing a coating to be used in producing digitized stereoscopic polarizing images by ink-jet printing, and formulating dichroic inks for ink-jet printing.

These and other objects will be apparent from the description that follows.

SUMMARY OF THE INVENTION

It has been discovered that the transfer of dichroic inks into stretched and oriented substrates to form digitized polarizing images and the like can be achieved by using coatings that enhance imbibition of the dye into the substrate. In one aspect of the invention, coatings are disclosed which serve to hold the dye in situ for a sufficient period of time to permit the dye transfer of rich colors while minimizing the problems of smearing and/or runoff of unabsorbed dye. The present invention is particularly useful in the adaptation of ink-jet printing techniques to the formation of digitized stereoscopic polarizing images.

In one preferred embodiment, the coating of the present invention comprises a viscous polymeric component that is permeable to dye molecules. The coating can, optionally, also include a second component that serves to retard lateral diffusion of the dye during imbibition. The polymeric component can be, for example, a natural gum or a synthetic polymer, and the lateral diffusion-limiting component can be a discontinuous particulate filler, such as silica.

The coatings can be permanent or temporary layers. In one embodiment, the coating can be removed following imbibition of the dye to the substrate. In another embodiment, the coating is permanent and includes a transparent, scratch resistant top surface and can also include UV blockers to protect the underlying image colors.

Prior to this invention, the use of ink-jet printers to apply ink to the surface of polyvinyl alcohol was often unsatisfactory. Without a coating, ink applied with the ink-jet printers typically smeared and smudged across the substrate, thus resulting in images lacking clarity and spatial precision. With a coating, as disclosed herein, the transfer of ink to a substrate and the imbibition of ink by the substrate can be regulated and controlled, thus ensuring a clear and accurate image.

BRIEF DESCRIPTION OF THE DRAWINGS

For a fuller understanding of the nature and objects of the invention, reference should be made to the following detailed description and the accompanying drawings, in which.

DETAILED DESCRIPTION OF THE INVENTION

Referring to FIGS. 1 through 5, wherein like reference numerals refer to like parts, there are illustrated various forms of polarizing sheets, light-polarizing images, and digitized stereoscopic polarizing images.

Figure 1:
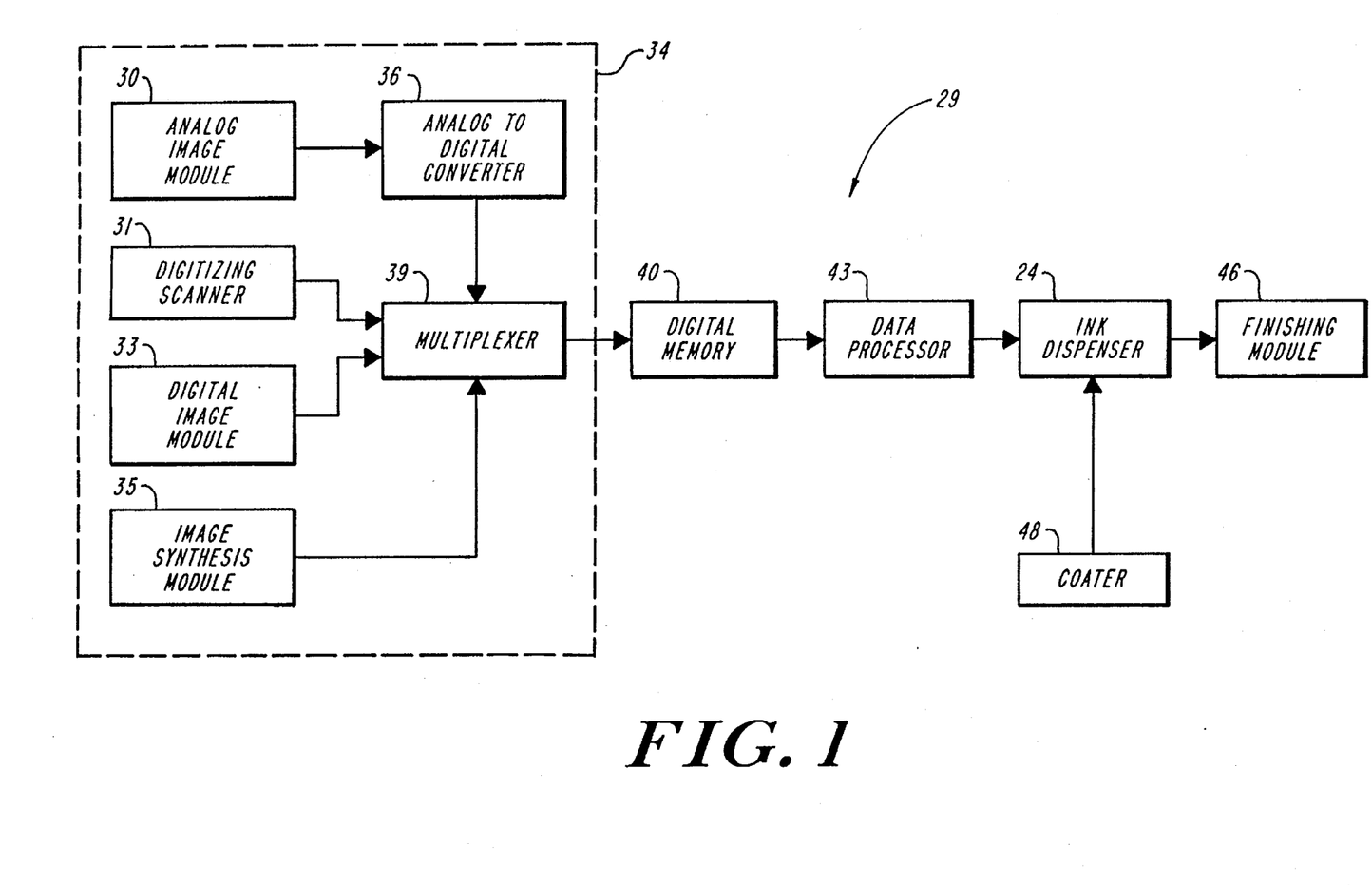
FIG. 1 shows a block diagram of a system for producing digitized stereoscopic polarizing images according to the invention.

FIG. 1 illustrates an imaging system 29 for producing digitized stereoscopic polarizing images, comprising an input stage 34, a digital storage device 40, a data processor 43, an ink-dispenser 24, a coater 48, and a finishing module 46. Input stage 34 can include an analog image module 30, a digitizing scanner 31, a digital image module 33, an image synthesis module 35, an analog-to-digital converter 36, and a multiplexer 39.

Input block 34 is coupled to memory element 40 and supplies memory element 40 with digitized data used for creating a stereoscopic pair. Preferably, input block 34 supplies two digitized data files for each picture in question, one representing the right-eye image and the other representing the left-eye image of a stereoscopic pair. Input stage 34 can accommodate multiple paths for creating digital stereoscopic imaging data, including, but not limited to: an analog image input path; a digitizing scanner input path; a digital image input path; and an image synthesis path.

In the analog image input path of system 34 shown in FIG. 1, an analog image module 30 supplies an electronic analog signal representing a normal flat image for conversion to digital data by module 36. For example, image module 30 can be a standard video camera. Preferably, analog image module 30 supplies two images, one representing a left-eye image and the other representing the right-eye image. Left and right-eye images can be generated through stereoscopic cameras designed for this purpose and known in the prior art.

The input side of analog-to-digital converter 36 is electrically coupled to analog module 30, and the output side of converter 36 is electrically coupled to multiplexer 39. Converter 36 receives a stream of analog data from module 30 and changes the analog data to digital data. Converter 36 outputs to multiplexer 39 digital data representative of the analog data output by module 30.

In the digitizing scanner input path, digitizing scanner 31 generates digital signals representing the flat representations of images, including photographs, slides, and the like. Preferably, digitizing scanner 31 is supplied with two images, one representing a left-eye image and the other representing the right-eye image, for which it generates two separate digital signals. Digitizing scanner 31 can be, for example, a Hewlett Packard ScanJet™ Scanner. Digitizing scanner 31 outputs, in digital format, a representation of the subject images to multiplexer 39.

In the digital image input path, digital image module 33 supplies a directly digitized image for conversion to a light polarizing image. Digital input module 33 may comprise, for example, a digital camera. In another embodiment, digital image module 33 may include a digital storage device, such as a CD ROM, or floppy disc containing a digital data file corresponding to an image. In addition, a pair of planar images that are right-eye and left-eye views may be produced in an image synthesis module 35 from seismic rotation cameras and CAD or CAM drawing programs.

Multiplexer, or selector, 39 connects either the signal generated by converter 36, digitizing scanner 31, digital image module 33, or image synthesis module 35 to digital memory 40. Alternatively, system 29 can exclude selector 39 and instead couple directly to digital memory 40 either converter 36, scanner 31, or digital image module 33. Digital memory 40 comprises a standard device for storing and retrieving digital signals, such as CD ROM, disc drives, tapes, magnetic memory devices, or random access memory. Digital memory 40 thus stores for later use data representing either a single image or a pair of left and right eye images for conversion into a stereoscopic pair of polarizing images.

Digital memory 40 is coupled to data processing apparatus 43. Data processing apparatus 43 includes an element for controlling ink-dispenser 24 and an element for processing digital data supplied by memory element 40.

Data processor 43 can include, for example, electronic apparatus capable of manipulating the data obtained from memory element 40 such that the image represented by the data can be flipped horizontally or vertically. The ability to flip the image represented by the data facilitates the stereoscopic registration of left and right eye images.

Data processor 43 can also include electronic apparatus that allows the data representing an image's pixel density to be manipulated in a manner that allows resizing, compression or expansion of the image. Preferably, data processing apparatus 43 also contains structures for touching up the image and for enhancing the clarity or contrast of the image. The image clarity can be enhanced by modifying the brightness, intensity, or hue characteristics of particular pixels in the image. One enhancement technique involves combining the image with its mathematical derivative. The derivative of the image enhances the clarity of edges in the image. In one embodiment, data processor 43 can also be used to modify the content of images, i.e., to produce composite images or collages or to remove unwanted elements. In one embodiment, data processor 43 can be a general purpose computer running Adobe Photoshop™ software.

In a preferred embodiment of this invention, digital memory 40 contains data representing both the left and right eye images of a picture being converted to a digitized stereoscopic image. In an alternative embodiment, digital memory 40 contains a three-dimensional data set describing the three-dimensional geometry of an object or of a scene: a computer graphic model. Image processing apparatus 43 is used to render left and right members of a stereoscopic pair of images of the object or scene with computer graphic techniques well known in the art. For example, stereoscopic image pairs can be produced from the data generated by image synthesis module 35 by rendering a model once and then rendering again after a small angular rotation around the vertical axis running through the model, or, in the case of a scene, rendering an image and then, after a small displacement in the horizontal position of the viewpoint, making a second rendering. Such computer graphic techniques produce with computer graphic modeling and rendering the equivalent left and right perspectives produced by stereoscopic image capture.

Data processing apparatus 43 generally reduces or increases the pixel density of the digitized images stored in memory element 40 to a pixel density appropriate to the desired percentage of polarization. For example, a digitized image may contain approximately 2000 pixels per inch while a desirable density for the light polarizing image is around 300 pixels per inch. In one embodiment, data processor 43 can reduce the pixel density by replacing a group of two or more adjacent pixels with a single new pixel representing a weighted average of the characteristics of the replaced group of adjacent pixels. In another embodiment, processor 43 can increase pixel density by adding new pixels to the image between already existing pixels. The characteristics of the newly generated pixels are determined by interpolation between adjacent pixels already in the image.

Data processing apparatus 43 is electronically coupled to ink-dispenser 24. Ink-dispenser 24 can include various ink-jet printers known in the art, and other printers capable of spraying ink. Generally all functions of ink-dispenser 24 are slaved to control signals generated by data processor 43, except for the quantity of ink sprayed for each dot of ink.

Ink-dispenser 24 applies, under the control of processor 43, the left-eye image to a first polarizing layer and the right-eye image to a second polarizing layer. The first and second sheets with left and right-eye images, respectively, become light-polarizing images. When the left and right-eye images are oriented such that their polarizing axes are orthogonal to each other, when stereoscopically registered, they bring each other to the contrast. In one preferred embodiment, ink-dispenser 24 applies left and right eye images to polarized layers on opposite sides of a single sheet 2, as described more fully by FIG. 5. The sheet described by FIG. 5 can have stretched and oriented PVA laminated to both sides of a non-depolarizing base, with one side oriented at −45° and the other at +45°.

A coater 48 can also be coupled to ink dispenser 24. Coater 48 supplies polarizing sheets having an ink-permeable polymeric coating to printer 24. Alternatively, the coating process can be practiced during manufacturing of the sheets. The ink-permeable polymeric coatings aid in the imbibition of ink by the polarizing sheets, as further described below.

Following printing and imbibition of the inks by a polarizing layer, the sheet can be processed in finishing module 46. Finishing module 46 can comprise, either alone or in combination, a washer for cleaning the image-bearing sheets, a protector for applying protective coatings, and a laminator for affixing one polarizing sheet to another.

Finishing module 46 can contain a washing system when the exterior of the polarizing image contains a removable coating or some active component that needs to be removed prior to storage. One embodiment of the washer comprises wiping the polarizing image with a sponge containing an aqueous solution to remove water soluble matter, such as a coating as later described in this disclosure. A second embodiment involves immersing the polarizing image in a tray containing an aqueous solution and then rubbing the sheet gently with a sponge to remove any water soluble matter on the exterior of the sheet. A third embodiment comprises passing the polarizing image between rollers in contact with a strip sheet. After removal of any matter on the exterior of the polarizing image using a washing system, the sheet can be drained and squeegeed or placed on dry toweling and wiped gently dry with soft toweling or tissues.

All of these washing systems can easily remove water soluble matter without damaging the polarized images.

Finishing module 46 can contain a protection system for applying protective layers to the polarizing image. For example, module 46 can apply a hardener, a protective polymeric coating, or a cross-linking agent to the exterior of the polarizing image. This hardener, protective polymer, or cross-linker protects the polarizing image over time from damage resulting from physical contact. Module 46 can also be used to apply a layer for protecting the polarizing image from the detrimental effects of ultraviolet radiation.

Following the optional washing or postcoating system 46 and any subsequent drying, left-eye and right-eye polarizing images are stereoscopically aligned and laminated back to back, if the left and right images were not applied to opposite sides of a single sheet originally. Two polarizing images can be stereoscopically aligned by ensuring that an identical point found in both images becomes the farthest point forward in the foreground of each individual polarizing image, and by superimposing the two polarizing images so that the farthest point forward in each image overlaps. The combination of two orthogonally polarized images as disclosed herein, produces a full color stereoscopic polarizing image when viewed through a pair of polarizing filters or glasses. An alternative embodiment is to print on a two sided light-polarizing sheet as described above.

Figure 2:
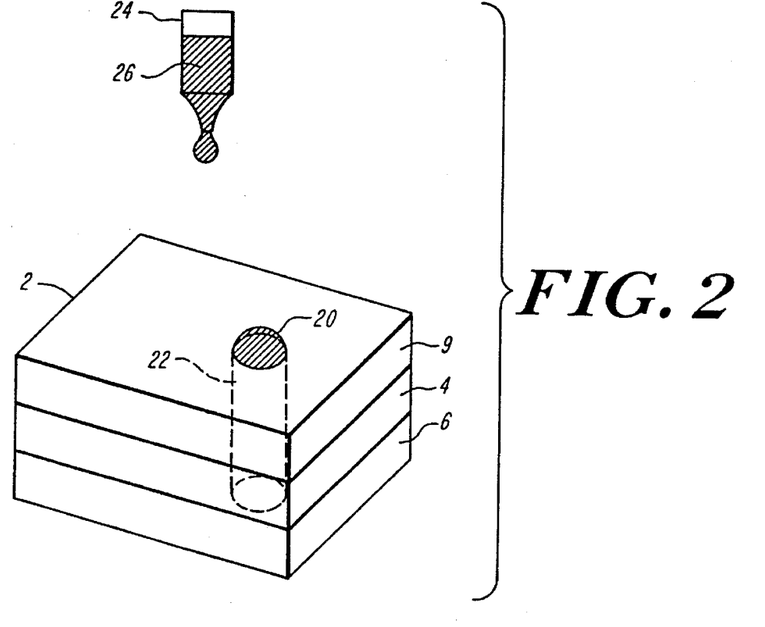
FIG. 2 shows a diagram of a polarizing sheet having a first coating according to the invention.

FIG. 2 illustrates a sheet 2 including a first coating 9 overlying a substrate 4. Substrate 4 can be carried on a backing 6. FIG. 1 also shows an ink dispenser 24 for applying various inks 26 to sheet 2. The inks are applied to the surface of coating 9 in individual dots forming ink pattern 20. Pattern 20 diffuses through coating 9 along an ink diffusion path 22 and is eventually imbibed by substrate 4.

Substrate 4 forms a sheet having a top and a bottom surface. The substrate transmits light and is composed of a substance that appears dichroic when dyed. Generally, substrate 4 can be formed of molecularly-oriented material, such as a stretched and oriented polymer, that allows alignment of dye molecules along parallel lines of substrate molecules. In addition, substrate 4 appears transparent prior to dyeing with ink 26, thus allowing the coloring of the image to be completely controlled by ink dispenser 24.

In one embodiment, substrate 4 is polyvinyl alcohol (hereinafter "PVA"), a long chain polymer that readily assumes a linear configuration upon heating and stretching and also absorbs dichroic stains or dyes. Sheets of PVA can be stretched and oriented according to various methods known in the art. Once stretched and oriented and dyed, the sheet of PVA exhibits properties of dichroism.

Substrate 4 holds a desired image or ink pattern 20 formed when ink 26 is imbibed by the layer comprising oriented molecules forming substrate 4. The pattern formed of printed dots of color, oriented along parallel lines of polymeric molecules, both transmit the image and polarize the light passing through substrate 4. The percentage polarization of light by substrate 4 is related to the density of the printed dots of color forming the desired image.

Base 6 abuts the bottom of substrate 4 and provides flexible support for substrate 4. Base 6 can comprise, for example, a non-depolarizing transparent polymer such as a cellulose acetate butyrate layer approximately 0.005 inches thick or cellulose triacetate layer approximately 0.003 inches thick. Light shined through the combination of substrate 4 and base 6 with the image of ink pattern 20 becomes polarized. These features prove useful when polarizing sheet 2 is used as a transparency or projection sheet.

Alternatively, two laminated images comprising a stereoscopic polarizing image or a single two-sided stereoscopic polarizing image may have a reflective layer mounted to the underside of this sheet containing the stereo image. The reflective layer can comprise, for example, paper coated with metal, a metal mirror, metal foil, or metal flakes suspended in plastic. The reflective layer reflects rays of light entering the top of substrate 4 and passing through base 6. The rays reflected back through base 6 and substrate 4 provide an image of ink pattern 20 to an observer.

Coating 9 overlies the top surface of substrate 4 and can be applied as a viscous fluid with a viscosity ranging from roughly 1000 to 1500 centipoise. The layer of viscous fluid, that dries to a clear film after approximately twenty-five minutes, maintains a coating thickness of substantially 0.02–0.03 micrometers. Coating 9 adheres to substrate 4 and ensures the uniformity of any subsequent coatings applied on top of coating 9.

According to this invention, coating 9 comprises a polymeric material. The polymeric material can be a natural or synthetic gum, a natural or synthetic thickener, or a natural or synthetic polymer, such as a cellulosic polymer. Examples of such cellulosic polymers include carboxymethyl cellulose (CMC) and hydroxyethyl cellulose (HEC). For example, the coating 9 can consist of a thin layer of xanthan gum. In an alternative embodiment, coating 9 can comprise a polymeric material in a solution, such as a solution of xanthan gum in deionized water.

Coating 9 is permeable to ink 26, but is not readily dyed or stained by the ink. Coating 9 serves the purpose of holding ink pattern 20 in situ for a period of time during which ink pattern 20 remains wet to the touch, but is held in its place as though it were dry. Over time, the ink migrates downward through coating 9 along ink diffusion path 22, rather than laterally across the top surface of coating 9. This allows the direct transfer of ink pattern 20 to the surface of substrate 4 at a controlled rate with substantially no change in the image formed by ink pattern 20, thereby allowing ink 26 to be imbibed by substrate 4 with substantially no lateral diffusion, smearing, or spreading. Coating 9, therefore, holds ink 26 and regulates and/or facilitates the transfer rate of ink 26 into substrate 4.

Figure 3:
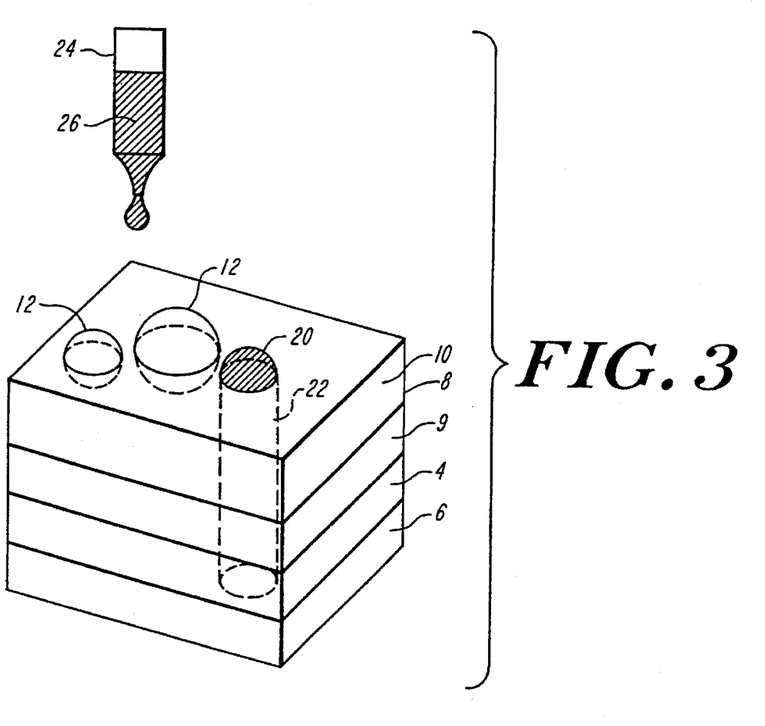
FIG. 3 shows a diagram of a polarizing sheet having a first and a second coating according to the invention.

FIG. 3 illustrates an alternative embodiment of sheet 2 having a second coating 8 extending over first coating 9, that in turn overlies substrate 4. Coating 8 may comprise either a polymeric material 10, or polymeric material 10 in combination with a particulate material 12. In addition, substrate 4 is laminated to backing 6.

Coating 8 overlies coating 9 and is applied after coating 9 has sufficiently dried. Coating 8 is applied as a viscous fluid having, for example, a viscosity ranging from about 5000 to 6000 centipoise. After approximately twenty-five minutes, the viscous fluid coagulates and forms a semi-solid layer having a height of approximately 0.1 micrometers.

Coating 8 can be a natural or synthetic gum, a natural or synthetic thickener, a natural or synthetic polymer (e.g. CMC, HEC, or other thickeners), or a combination of natural and synthetic polymeric materials. For example, the polymeric material of coating 8 can include gums, such as xanthan gum. Alternatively, coating 8 can comprise a polymeric material in a solution, such as deionized water.

Both coating 8 and coating 9, either alone or in combination, advantageously hold ink pattern 20 in situ and enable the downward migration of ink 26 along ink diffusion path 22, rather than laterally through the coatings. This allows the direct transfer of ink pattern 20 to the surface of substrate 4 at a controlled rate thereby allowing ink 26 to be imbibed by substrate 4 with substantially no lateral diffusion, smearing, or spreading. Coatings 8 and 9, therefore, hold ink 26 and regulate and/or facilitate the transfer rate of ink 26 into substrate 4.

In the illustrated embodiment, coating 8 contains a particulate 12, for example HPLC grade silica or colloidal silica, that inhibits lateral diffusion of dye molecules within the polymeric material forming the coating. HPLC grade silica can be purchased commercially from WATERS, Chromatography Division, Millipore Corporation, Milford, Mass., 01757. One such coating formed according to this invention is a compound formed of xanthan gum and silica. In general, particulates 12 each range from about 15 to 20 micrometers in diameter.

The ratio of dye permeable, or polymeric material 10, to particulate 12 contained in coating 8 may be varied in order to effect the migration of ink from the top of coating 8 to the bottom of coating 8 and to limit the migration laterally across coating 8. As the ratio of particulate to dye permeable material rises less lateral migration occurs, and as the ratio of particulate to dye permeable material falls more lateral migration occurs. The ratio is modified according to various factors, including: the composition of ink 26, the thickness of coating 9, the thickness of coating 8, and the characteristics of ink dispenser 24 and ink 26. Generally, when particulates are incorporated into the coating, such particulates will range from about 0.35 to about 0.75 percent (by weight) of coating 8.

With reference to FIG. 2 and FIG. 3, coated sheets not printed on within 24 hours can be prevented from drying out, in order that the coatings retain their properties. This may be prevented by wrapping sheet 2 in plastic within an hour after the coatings 8 and 9 have become solidified but retain moisture. Alternatively, sheet 2 can be overcoated with a strippable polymeric film coat to prevent excessive drying. A polymeric film coat applied within 24 hours retains the moisture in the coatings and can be easily removed prior to applying ink 26.

After ink 26 has been applied to sheet 2, it is allowed to dry. The drying time may be quite rapid or take one minute or longer. Various factors will influence the drying time, including the surface tension of ink 26, ink flow resulting from the various characteristics of ink dispenser 24, the thickness of coatings 8 and 9, and the density of ink pattern 20.

The first coating 9 and the second coating 8 may both contain a fungicide to hinder the growth of various microorganisms and mold. The fungicide kills micro-organisms and mold known to feed on polymeric material, thus preventing the same organisms from damaging and potentially destroying coating 8 or coating 9.

In addition, coatings 8 and 9 can form temporary or permanent layers. If temporary, the coatings are generally water soluble to allow easy removal of the coatings. If permanent, the coatings typically are not water soluble or are subsequently overcoated to render the coatings 8 and/or 9 impervious to water damage. Furthermore, the permanent coatings should be transparent and have no significant capability of being dyed as a result of contact with the ink, in order to allow unobstructed viewing of the image or pattern created in substrate 4.

Figure 4:
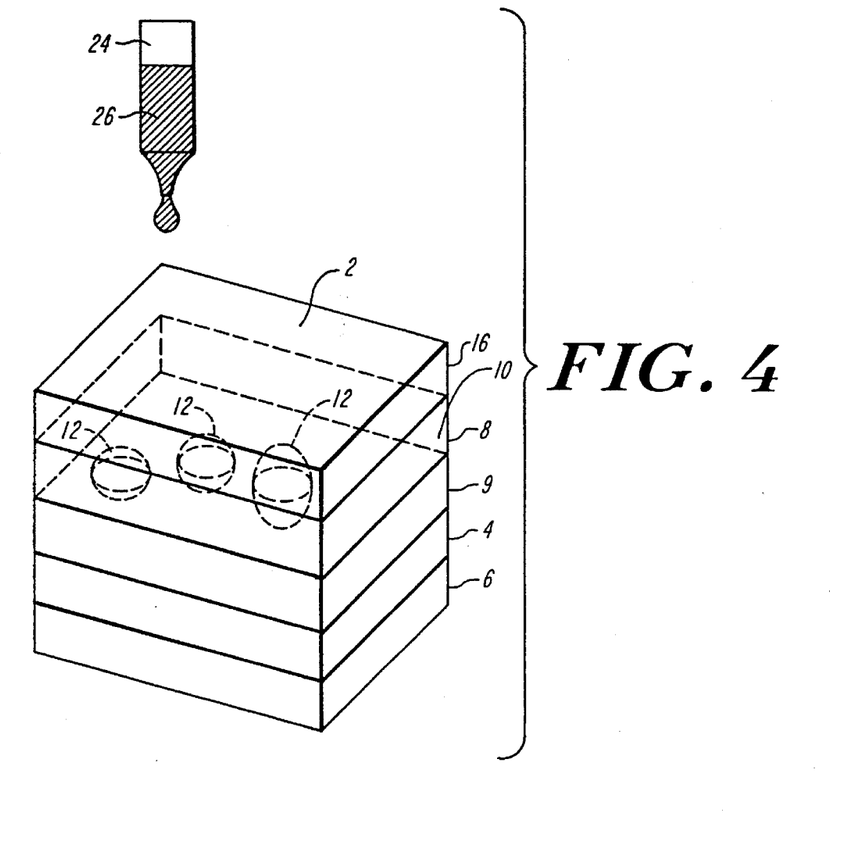
FIG. 4 shows a cross-sectional diagram of a polarizing sheet having a protective layer according to the invention.

FIG. 4 illustrates a sheet 2 according to this invention with permanent coatings 8 and 9 and a protective layer 16 applied after ink 26 has been imbibed by substrate 4 and allowed to dry. Protective layer 16 is formed by treating the top surface of coatings 8 or 9 with a hardener or cross linker designed to alter the polymeric material, thereby rendering coatings 8 or 9 less water-soluble and more durable. In one embodiment, protective layer 16 can be water resistant, and scratch and abrasion resistant, thus preventing marks and indentations that would alter an observer's view of an image in substrate 4. According to another aspect of this invention, protective layer 16 can be designed to absorb ultraviolet radiation in order to retard the fading of the images over time.

Inks 26, in accordance with the invention, can be formulated to permit rapid start-up in a printing head, provide smooth transfer during the spraying involved in ink-jet printing operations, and exhibit controlled drying on substrate 4 and coatings 8 and 9. Inks 26 comprise a de-salted dichroic dye, and a mixture of deionized water and polyhydric alcohol in appropriate proportions to ensure controlled flowing and drying. One preferred polyhydric alcohol is diethylene glycol. In formulating ink 26, the water to polyhydric alcohol ratio varies as a function of the type of ink dispenser being used. For example, in the case of the low end ink-jet printers (i.e. those without heaters) the ink composition can contain 85–90% water and correspondingly 15–10% polyhydric alcohol; and in the case of high end ink-jet printers (i.e. those with heaters) the ink compound can contain 90–95% water and correspondingly 10–5% polyhydric alcohol.

Ink 26 can further include a complexing agent, such as Ethylenediaminetetraacetate (hereinafter "EDTA"), or a preservative, such as dehydrosodium acetate. Complexing agents can be added to ink 26 to complex metals. Complexing agents, such as EDTA, can be obtained from Sigma Chemical Company of Saint Louis, Mo. Alternatively, ink 26 may include both the complexing agent and the preservative. The complexing agent and the preservative combined account for no more than 0.2% (by weight) of the ink compound.

The inks 26 used in printing, according to this invention, contain a water-soluble, salt-free, direct dye of the azo type. The dyes chosen possess the property of dichroism, when properly oriented on substrate 4. De-salting the dyes used in the inks are accomplished using standard desalting methods such as dialysis, reverse phase chromatography, high-pressure liquid chromatography, reverse osmosis, and ultrafiltration.

One specific assortment of dyes useful for R, G, B printing is Cyan, Magenta and Yellow (minus Red, minus Green, minus Blue). The Cyan dye comprises a direct Green #27 at 2.0% concentration, the Magenta dye comprises a combination of 30% Direct Red #117 and 70% Sands Violet #9 at a total concentration of 1.0%, and the Yellow dye comprises a Primula Yellow from Hodagaya at 2.0% concentration. The particular grouping of dyes currently used for C, M, Y, K printing are Cyan, Magenta, Yellow, and Black. The Cyan, Magenta, and Yellows dyes are formed as disclosed above, and the Black dye comprises a Direct Black #170 at 3.0% concentration.

Images can be transferred to sheet 2 using an ink-dispenser 24 consisting of gelatin relief images, as disclosed in the prior art. However, more advanced systems for transferring images to sheet 2 and for generating stereoscopic polarizing images can be utilized in accordance with this invention.

Figure 5:
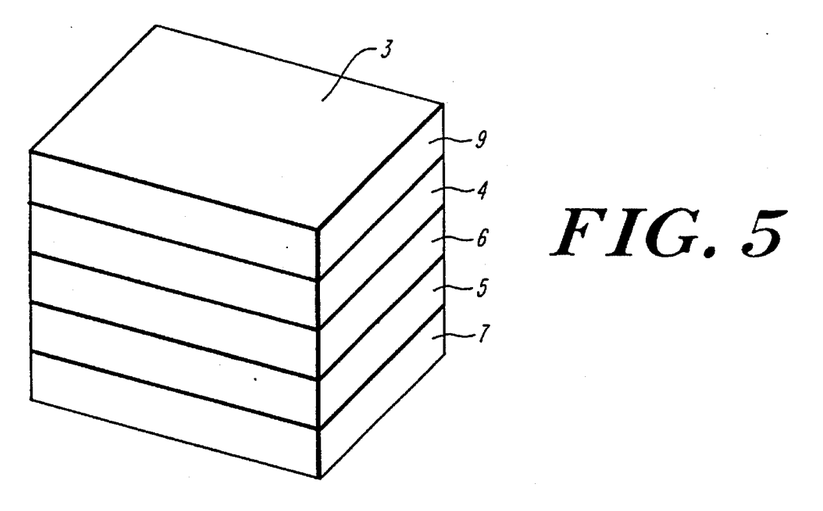
FIG. 5 shows a cross-sectional diagram of a multilayer sheet capable of forming a pair of polarizing images according to the invention.

FIG. 5 shows a preferred stereoscopic polarizing image 3 having a 0.003 inch thick triacetate base 6, a first molecularly-oriented substrate 4 laminated to the top surface of base 6, and a second molecularly-oriented substrate 5 laminated to the bottom surface of base 6. Substrates 4 and 5 are oriented such that their respective molecular orientations are at opposing 45 degree angles to the running edge of base sheet 6 and at 90 degrees to each other. Coating 9 (as described herein) is mounted to the top of substrate 4, and a second coating 7 is mounted to the bottom of substrate 5. The combination of substrates 4 and 5, coatings 7 and 9, and base 6 result in a multilayer structure approximately 0.004 inches thick. This combination is thin enough to fit well within the tolerances of standard ink-jet printers.

In accordance with this invention, coating 9 is applied to the top surface of substrate 4 and a second coating 7 is applied to the bottom surface of substrate 5. After the coatings have dried, sheet 3 is then coated with a strippable polymer coat to prevent excessive drying of coatings 7 and 9. At that point, sheet 3 can be slit and cut into units of suitable sizes for printing.

This embodiment advantageously allows printing of a desired image or pattern to both sides of single sheet 3, thus removing any alignment problems when forming a stereoscopic polarizing image. Accordingly, sheet 3 is inserted into ink-dispenser 24 for application of a first image. After drying, sheet 3 is then flipped and re-inserted into ink-dispenser 24 for application of a second image. This system forms a complete stereoscopic polarizing image having two differently polarized images laminated together without having to physically align and superimpose separately produced polarizing images.

Figure 6:
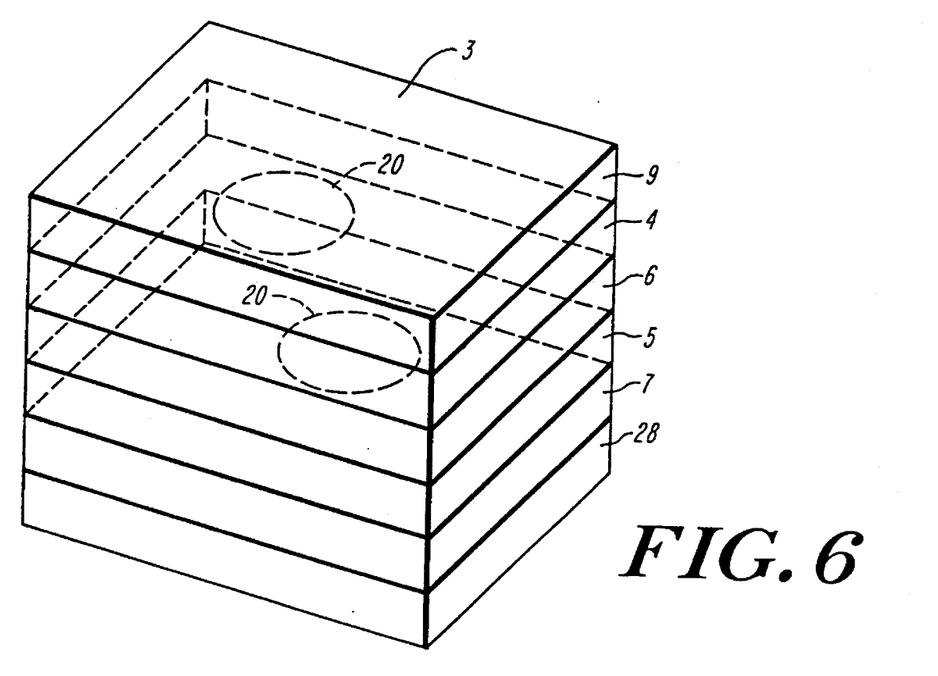
FIG. 6 shows a multi-layer sheet having a reflective layer.

FIG. 6 illustrates a stereoscopic polarizing image 3 with a reflective layer 28 mounted to the bottom surface of stereoscopic polarizing image 3. Reflective layer 28 reflects rays of light entering the top of image 3 back through image 3 to provide an image of ink pattern 20 to an observer.

Ink-jet printing methods and systems in accordance with this invention greatly simplify the preparation of full-color stereoscopic polarizing images. Ink-jet printers, unlike imbibition transfer apparatus, are compatible with digital imaging and can be used to provide stereoscopic reflective or transparent polarizing images from computer-generated or digitally-processed images, as well as from conventional photographic images that may have been digitized. Stereoscopic light polarizing images produced according to the techniques disclosed in this invention may be produced without the knowledge and use of photographic chemistry, as required with prior techniques. Stereoscopic prints produced in this manner have the added advantage of being easily and inexpensively modifiable. By simply altering the picture in the computer or digital imager, the stereoscopic image may be reprinted in its modified form. In addition, because ink-jet printers simultaneously print multiple colors aligned according to the digitized image, the problems in the prior art associated with aligning six gelatin reliefs are overcome. This invention easily and inexpensively produces a hard copy that provides three-dimensional images representing true spatial dimensionality.

While the invention has been shown and described having reference to specific preferred embodiments, those skilled in the art will understand that variations in form and detail may be made without departing from the spirit and scope of the invention. Having described the invention, what is claimed as new and secured by letters patent is:

1. A treated sheet material for recording an image, the treated sheet material comprising a substrate having a top surface and a bottom surface, and a coating overlying the top surface of the substrate, the coating comprising an ink-permeable polymeric material for transporting ink molecules from an upper surface of the coating to the underlying substrate and for regulating imbibition of the ink molecules by the substrate.

2. A treated sheet material according to claim 1 wherein the ink-permeable polymeric material is a gel.

3. A treated sheet material according to claim 1 wherein the ink-permeable polymeric material is chosen from the group consisting of natural and synthetic gums.

4. A treated sheet material according to claim 1 wherein the ink-permeable polymeric material is a cellulosic polymer.

5. A treated sheet material according to claim 1 wherein the coating further comprises dispersed particulates for inhibiting lateral diffusion of ink molecules.

6. A treated sheet material according to claim 5 wherein the particulates range from about 15 to about 20 micrometers in size.

7. A treated sheet material according to claim 5 wherein the particulates comprise about 0.35 to about 1.0 weight percent of the coating.

8. A treated sheet material according to claim 1 wherein the particulates are colloidal silica.

9. A treated sheet material according to claim 1 wherein the coating is water soluble.

10. A treated sheet material according to claim 1 wherein the coating further comprises a water-resistant upper protective layer.

11. A treated sheet material according to claim 10 wherein the protective layer is scratch and abrasion resistant.

12. A treated sheet material according to claim 10 wherein the protective layer absorbs ultra-violet radiation.

13. A treated sheet material according to claim 1 wherein the coating further comprises a fungicide.

14. A treated sheet material according to claim 1 wherein the coating has a thickness ranging from about 0.02 to about 0.03 micrometers.

15. A treated sheet material for recording an image, comprising a stretched and oriented polymer substrate, and a coating overlying the substrate, the coating comprising an ink-permeable polymeric material for transporting ink molecules from an upper surface of the coating to the underlying substrate.

16. A treated sheet material according to claim 15 wherein the ink-permeable polymeric material is a gel.

17. A treated sheet material according to claim 15 wherein the ink-permeable polymeric material is chosen from the group consisting of natural gums, synthetic gums, and cellulosic polymers.

18. A treated sheet material according to claim 15 wherein the coating further comprises dispersed particulates for inhibiting lateral diffusion of ink molecules.

19. A treated sheet material according to claim 18 wherein the particulates range from about 15 to about 20 micrometers in size.

20. A treated sheet material according to claim 18 wherein the particulates comprise about 0.35 to about 1.0 weight percent of the coating before drying.

21. A treated sheet material according to claim 15 wherein the particulates are colloidal silica.

22. A treated sheet material according to claim 15 wherein the coating is water-soluble.

23. A treated sheet material according to claim 15 wherein the coating is permanent.

24. A treated sheet material according to claim 23 wherein the coating further comprises a water-resistant upper protective layer.

25. A treated sheet material according to claim 24 wherein the protective layer is scratch and abrasion resistant.

26. A treated sheet material according to claim 24 wherein the upper protective layer absorbs ultra-violet radiation.

27. A treated sheet material according to claim 15 wherein the coating further comprises a fungicide.

28. A treated sheet material according to claim 15 wherein the coating has a thickness ranging from about 0.02 to about 0.03 micrometers.

29. A treated sheet material according to claim 15 wherein the substrate is formed of polyvinyl alcohol.

30. A treated sheet material according to claim 1, further comprising a second coating spanning the bottom surface of the substrate, the second coating also being formed of an ink-permeable polymeric material for transporting ink molecules.

31. A treated sheet material according to claim 30, wherein the substrate is formed of a first molecularly oriented sheet aligned along a first axis and a second molecularly oriented sheet aligned along a second axis, the second axis being substantially orthogonal to the first axis.

32. A treated sheet material in accordance with claim 30, further comprising a reflective layer mounted to said second coating.

* * * * *